(12) United States Patent
Higgins et al.

(10) Patent No.: US 9,908,196 B2
(45) Date of Patent: Mar. 6, 2018

(54) VARIABLE SWITCHING FREQUENCY POWER SUPPLY PLASMA CUTTERS

(71) Applicant: The ESAB Group, Inc., Florence, SC (US)

(72) Inventors: Philip K. Higgins, Florence, SC (US); Karunakar Gujja, Florence, SC (US); John W. Hamer, III, Florence, SC (US)

(73) Assignee: The ESAB Group Inc., Florence, SC (US)

( * ) Notice: Subject to any disclaimer, the term of this patent is extended or adjusted under 35 U.S.C. 154(b) by 0 days.

(21) Appl. No.: 14/786,871

(22) PCT Filed: Apr. 10, 2014

(86) PCT No.: PCT/US2014/033616
§ 371 (c)(1),
(2) Date: Oct. 23, 2015

(87) PCT Pub. No.: WO2014/176036
PCT Pub. Date: Oct. 30, 2014

(65) Prior Publication Data
US 2016/0067812 A1    Mar. 10, 2016

Related U.S. Application Data

(60) Provisional application No. 61/815,335, filed on Apr. 24, 2013.

(51) Int. Cl.
*B23K 10/00* (2006.01)
*H05H 1/36* (2006.01)
*H02M 3/156* (2006.01)

(52) U.S. Cl.
CPC ............. *B23K 10/006* (2013.01); *H05H 1/36* (2013.01); *H02M 3/156* (2013.01)

(58) Field of Classification Search
CPC ........... H05H 1/36; H05H 1/26; H02M 3/156; B23K 10/00; B23K 10/006
(Continued)

(56) References Cited

U.S. PATENT DOCUMENTS 6,286,609 B1  9/2001  Carrier et al.
6,784,648 B2 * 8/2004  Mitamura ............. H02M 3/157
                                                    323/282

(Continued)

FOREIGN PATENT DOCUMENTS

WO    2008033901 A2    3/2008
WO    2010141431 A1    12/2010

OTHER PUBLICATIONS

International Search Report dated Aug. 22, 2014 for PCT Patent Application PCT/US2014/033616 Filed Apr. 10, 2014.
(Continued)

*Primary Examiner* — Mark Paschall
(74) *Attorney, Agent, or Firm* — Edell, Shapiro & Finnan, LLC (57) ABSTRACT

A power supply, for a plasma cutter or a plasma arc welder, having a variable switching frequency and method of operating the power supply is generally disclosed. The power supply includes a switch for setting the switching frequency and a chopper control circuit for determining current output from the power supply, determining an operating frequency based on the determined current output and setting the switching frequency based on the determined operating frequency.

20 Claims, 5 Drawing Sheets

(58) Field of Classification Search
USPC .... 219/121.54, 121.57, 121.5, 130.1, 130.51
See application file for complete search history.

(56) References Cited

U.S. PATENT DOCUMENTS

| | | | |
|---|---|---|---|
| 6,900,408 B2 | 5/2005 | Picard et al. | |
| 8,957,592 B2* | 2/2015 | Nishiie | H02M 1/4225 |
| | | | 315/224 |
| 9,240,736 B2* | 1/2016 | Shimomugi | H02M 7/066 |
| 2005/0051524 A1* | 3/2005 | Blankenship | B23K 9/1062 |
| | | | 219/130.51 |
| 2007/0059016 A1* | 3/2007 | Sato | G03G 15/80 |
| | | | 399/88 |
| 2007/0262065 A1* | 11/2007 | Peters | B23K 9/092 |
| | | | 219/130.5 |
| 2008/0083714 A1 | 4/2008 | Kamath et al. | |
| 2010/0246227 A1* | 9/2010 | Shimizu | H02M 3/156 |
| | | | 363/126 |
| 2011/0057634 A1* | 3/2011 | Kunimatsu | H02M 3/156 |
| | | | 323/282 |
| 2012/0118865 A1* | 5/2012 | Stava | B23K 9/1006 |
| | | | 219/130.31 |
| 2014/0071717 A1* | 3/2014 | Murata | H02M 3/33507 |
| | | | 363/21.17 |
| 2016/0036317 A1* | 2/2016 | Shimomugi | H02M 1/4225 |
| | | | 363/53 |

OTHER PUBLICATIONS

Extended European Search Report for EP14788172, dated Nov. 7, 2016.

* cited by examiner

VARIABLE SWITCHING FREQUENCY POWER SUPPLY PLASMA CUTTERS

CROSS-REFERENCE TO RELATED APPLICATIONS

This application is a 371 National Phase of PCT/US2014/033616 filed on Apr. 10, 2014, which is related to and claims priority from U.S. Provisional Patent Application No. 61/815,335, filed on Apr. 24, 2013, by Higgins, et al., entitled: "Variable Switching Frequency Power Supply for Plasma Cutters and Plasma Arc Welders", which is incorporated herein by reference in its entirety.

FIELD OF THE INVENTION

Embodiments of the present invention relate generally to the field of power supplies, and more particularly to varying the switching frequency of a power supply used to power a plasma torch or a plasma arc welder.

BACKGROUND OF THE DISCLOSURE

Plasma cutting and plasma arc welding tools are typically powered with a switching power supply. Conventionally, these switching power supplies were configured to have a single fixed switching frequency. The switching frequency was often selected such that the power supply exhibited minimal switching losses at full output current. However, this often resulted in an inefficient supply of power at all except maximum output current. Some modern switching power supplies that are used to power plasma cutters and plasma arc welders may be configured to have two switching frequencies. For example, one frequency may be used for the high current output range and another for the low current output range. However, even with multiple switching frequencies, it may be difficult to maintain proper arc stability with acceptable switching losses throughout the entire operating range of the power supply. In particular, at low output currents, the power supply may have too high switching losses to maintain proper arc stability and at high output currents the current ripple may be greater than desired.

In view of the forgoing, it is apparent that conventional power supplies for plasma cutters and plasma arc welders suffer from the inability to maintain proper arc stability at low currents and experience too high current ripple at higher currents.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments of the present disclosure are generally directed to a power supply for forming a plasma arc using a plasma tool, the power supply comprising a direct current (DC) power source, a chopper circuit configured to modulate the switching frequency of the DC power source, and a chopper control module configured to vary the switching frequency of the chopper circuit.

With some embodiments, the chopper control module may include a measurement module configured to measure the output current from the power supply, a processor configured to determine an ideal switching frequency, and a chopper control module configured to cause the switching frequency of the power supply to be substantially equal to the determined ideal switching frequency.

The present disclosure additionally describes a method for operating a power supply. The method may comprise: measuring the current output from the power supply to a load, determining an ideal switching frequency based on the measured output current, and setting the switching frequency of the power supply to be substantially equal to the determined ideal switching frequency.

BRIEF DESCRIPTION OF THE DRAWINGS

Various illustrative embodiments of the present disclosure will now be described with reference to the accompanying drawings, in which.

DETAILED DESCRIPTION

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1A:
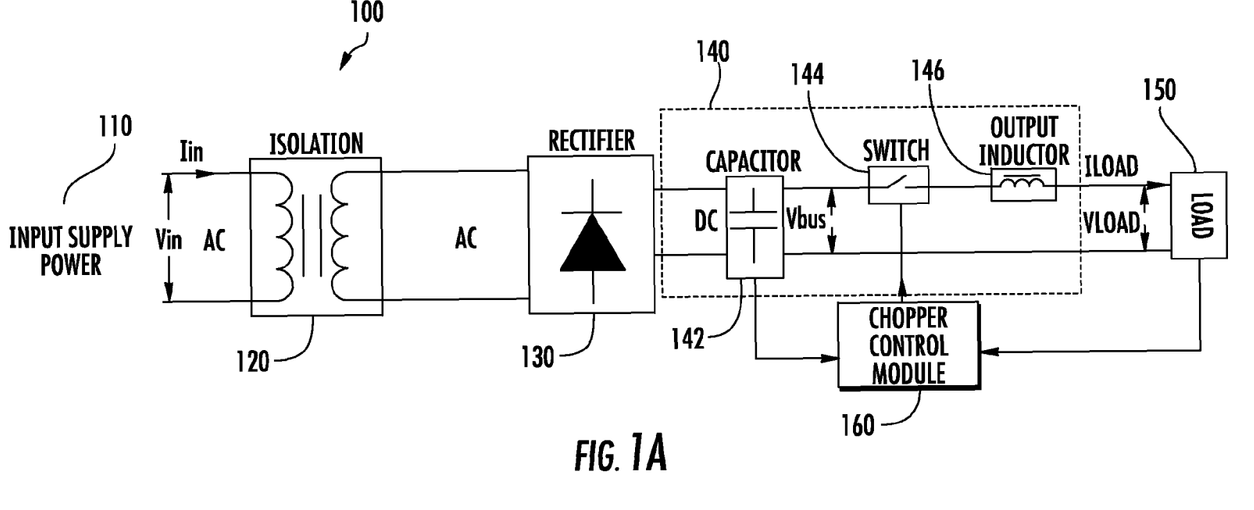
FIG. 1A illustrates a block diagram of a variable frequency power supply for a plasma cutter or plasma arc welder.

As stated above, conventional power supplies for plasma cutters and plasma arc welders suffer from too high switching losses and too high current ripple at different portions of the operating range. The following equations show the relationship between switching frequency, switching losses, input voltage, output voltage and current ripple.

$$I_{Ripple} = ((V_{Bus} - V_{Load}) * D * T)/L$$

$$I_{Ripple} = ((V_{Bus} - V_{Load}) * D)/(F_{SW} * L)$$

$$P_{SW\text{-}Loss} = K * F_{SW}$$

Where $I_{Ripple}$ is the output inductor 146 ripple current, $V_{Bus}$ is the voltage on the bus, $V_{Load}$ is the voltage supplied to the load 150, D is the duty cycle of the switch 144, T is the switching period, $F_{SW}$ is the switching frequency and L is the inductance of the output inductor 146, $P_{SW\text{-}Loss}$ is the switching power loss, and K is a proportional constant based on the factor of conduction current through the switch 144, voltage across the switch 144 and the ON resistance of the switch 144. As can be seen from these equations, the ripple current is inversely proportional to, and the switching losses are directly proportional to, the switching frequency. Accordingly, as the switching frequency increases, switching losses increase and at the same time the output ripple currents decrease.

Various embodiments of the present disclosure provide a power supply and method of operating such, that enable variance of the switching frequency throughout the entire operating current range of the plasma cutter or plasma arc welder. Accordingly, a lower switching frequency may be used at full output currents compared to conventional power supplies, which reduces the switching losses and also reduces the heating losses within the switching elements, all without a substantial compromise to the plasma arc stability. Additionally, higher switching frequencies may be used at intermediate output currents in order to reduce the output ripple currents, which in turn improves the efficiency of the machine as well as improves the life of consumables used in the machine (e.g., cutting tips, welding tips, or the like).

FIG. 1A illustrates an exemplary variable frequency power supply 100 in accordance with at least some embodiments of the present disclosure. In general, the power supply 100 may be used to supply power to a plasma cutting tool, a plasma arc welding tool, or other tool that forms a plasma arc. The power supply 100 may include an input power source 110. In some examples, the input power source 110 may be a connector for connecting the power supply 100 to an alternating current (AC) power source. With some examples, the input power source 110 may be a generator for supplying AC power to the power supply 100. The power supply 100 may further include an isolation transformer 120 for isolating the components of the power supply 100 from the input power source 110.

The power supply 100 may also include a rectifier circuit 130 for converting alternating current (AC) from the input power source 110 to direct current (DC), which is then used to power a chopper circuit 140. In some examples, the rectifier circuit 130 may be any suitable rectifier circuit and/or device configured to convert AC to DC. For example, the rectifier circuit 130 may be a half-wave rectifier, a full-wave rectifier, a bridge rectifier, or the like.

The chopper circuit 140 receives unregulated DC power from the rectifier 130 and supplies regulated DC power to a load 150 (e.g., a plasma cutting tool, a plasma arc welding tool, or the like). The chopper circuit is configured to pulse width modulate (PWM) the DC power supplied to the load 150. As depicted, the chopper circuit 140 may include a capacitor 142, a switch 144 and an output inductor 146. In some examples, the output inductor 146 is a step-gap inductor, which has a higher inductance value for low output load currents and a lower inductance value for high output load currents. With some examples, the switch 144 can be a solid-state switching device, such as, for example, an insulated gate bipolar transistor (IGBT), a metal-oxide-semiconductor field-effect transistor (MOSFET), or a similar solid-state switching device. In practice, the switch 144 opens and closes creating a pulse width modulated DC signal. This modulated signal is what is supplied to the load 150 through output inductor 146. It is to be appreciated, that the topology shown in FIG. 1A for the chopper circuit 140 is given for illustrative purposes only and is not intended to be limiting. For example, in some implementations, the chopper circuit 140 may correspond to a boost DC chopper, a buck DC chopper, a buck-boost DC chopper, a Cuk DC chopper, or the like.

The power supply 100 further includes a chopper control module 160 electrically connected to the chopper circuit 140 and the load 150. In general, the chopper control module 160 may be configured to regulate the period of the switch 144, as detailed below, which will effectively control the switching frequency of the power supply 100. For example, the chopper control circuit 160 may provide switching pulses (e.g., voltage pulses, or the like) to the switch 144 controlling the opening and closing of the switch 144 in order to cause the switching frequency of the power supply to substantially correspond to a desired switching frequency.

Figure 1B:
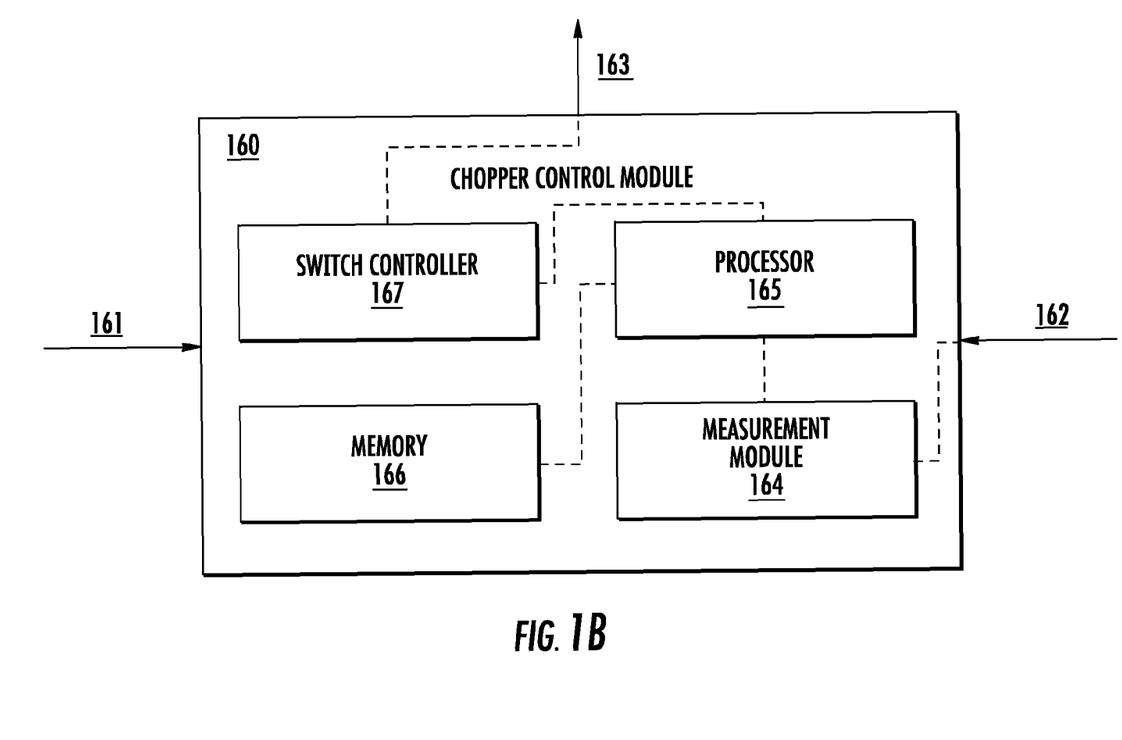
FIG. 1B illustrates a portion of the power supply of FIG. 1A in greater detail.

FIG. 1B illustrates the chopper control module 160 in greater detail. As depicted, the chopper control module 160 of FIG. 1A may include inputs 161 and 162, which are electrically connected to the capacitor 142 and the load 150 respectively; and output 163, which is electrically connected to the switch 144.

The chopper control module 160 may further include a measurement module 164 electrically connected to the input 162. The measurement module 164 may be configured to determine the value of the current supplied to the load 150 ("Iload") during operation of the power supply 100. In some embodiments, the measurement module 164 may determine Iload from the load 150 itself. For example, if the load is a plasma cutter or a plasma arc welder, the load may include functionality to regulate, measure, and/or determine the current supplied to the cutting or welding torch during operation. Accordingly, the measurement module 164 may determine Iload from the built in functionality of the plasma cutter or plasma arc welder. In alternative embodiments, the measurement module 164 may be a DC ammeter, electrically connected to the power supply 100 and configured to measure Iload directly.

The chopper control module 160 may also include a processor 165 configured to execute a number of predefined instructions, a non-volatile memory 166 that may store predefined instructions for execution by the processor 165, as well as data for use in executing the predefined instructions. As depicted, the measurement module 164 and the memory 166 are operably connected to the processor 165. During operation, the processor 165 may be configured to determine an ideal switching frequency for the chopper circuit 140 based at least in part upon Iload. In some examples, the processor may derive the ideal switching frequency based on a linear function. In alternative examples, the processor may look up the ideal switching frequency in a look-up table stored in the memory 166. With some embodiments, the processor 166 may be configured to determine the ideal switching frequency based at least in part on the load 150 itself. For example, the processor 165 may be configured to identify the load 150 (e.g., plasma cutter, plasma arc welder, or the like) as well as the operating range for the load 150 (e.g., 200 Amps, 360 Amps, 540 Amps, 720 Amps, or the like). The processor 166 may then determine the ideal switching frequency based at least in part on the identified type and operating range. Further exemplary operations for determining the operating frequency will be discussed with reference to FIG. 2 below The chopper control module 160 may also include a switch controller 167 (e.g., microcontroller, servo microcontroller, or the like) operably connected to the processor 165 and the output 163. The switch controller 167 may be configured to cause the switch 144 to open and close in a set period, thereby setting the switching frequency of the power supply 100 to be substantially equal to the ideal switching frequency determined by the processor 165.

Figure 2:
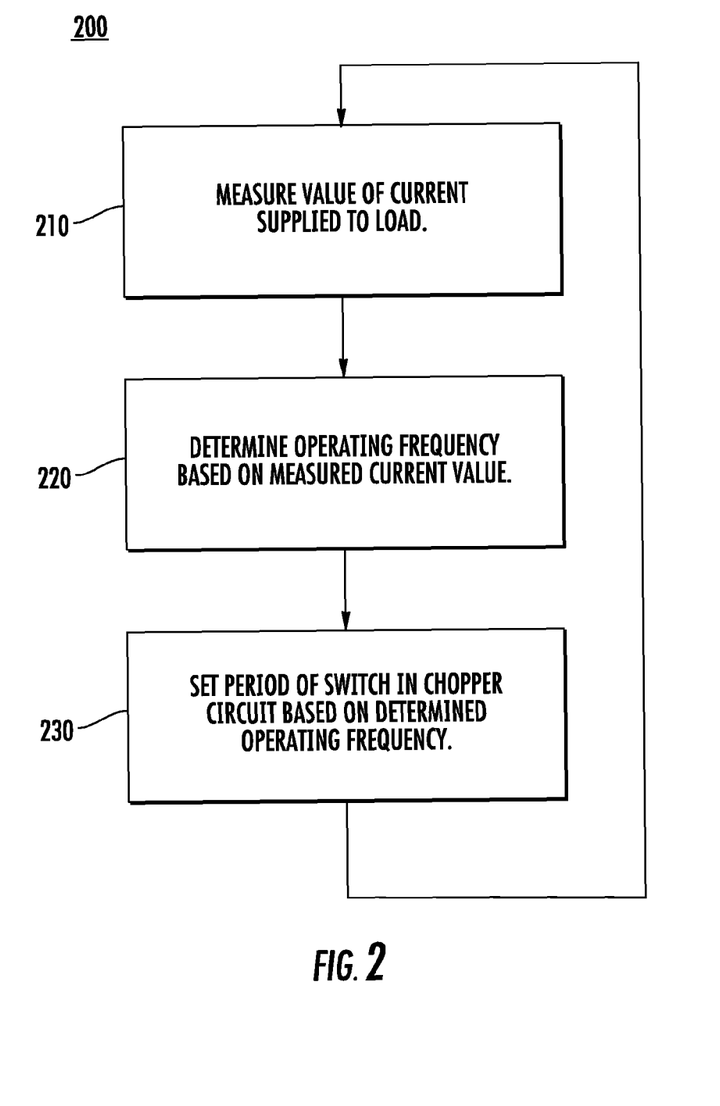
FIG. 2 is a flow diagram illustrating an exemplary method for varying the switching frequency of a power supply.

FIG. 2 is a logic diagram illustrating an exemplary method 200 of operating the chopper control circuit 160, arranged in accordance with at least some embodiments of the present disclosure. Generally, the method 200 may be used to control the switching frequency of the power supply 100, as will be described in greater detail below.

The method 200 may begin at block 210, where the measurement module 164 may include logic and/or features configured to measure the current supplied to the load 150 (Iload). For example, as described above, in some examples, the measurement module 150 may determine Iload from the load 150 (e.g., based on built-in functionality of the load 150.) Alternatively, the measurement module 164 may determine Iload directly (e.g., using an ammeter or the like.)

Continuing from block 210 to block 220, the processor 165 may be configured to determine an ideal switching frequency based at least in part on Iload. For example, in some embodiments, the processor may derive the ideal switching frequency based on a linear function. More particularly, with some examples, the ideal switching frequency may be determined based on a linear relationship between operating current ranges and a preferred frequency range, where the frequency is linearly reduced as the operating current (e.g., Iload) increases.

As a specific example, in some embodiments, at block 220, the processor 165 may be configured to determine the ideal switching frequency to be 25 kHz for Iloads less than or equal to 50 Amps. The processor 165 may determine the ideal switching frequency by linearly reducing the frequency from 25 kHz and 15 kHz through the rest of the operating current range. For example, the operating frequency may be determined using the following equation.

$$\begin{cases} f = 25 \text{ kHz}, & Iload \leq 50 \text{ Amps} \\ f = 25 \text{ kHz} - 10 \text{ kHz} * \left( \frac{Iload - 50 \text{ Amps}}{MaxI - 50 \text{ Amps}} \right), & Iload > 50 \text{ Amps} \end{cases}$$

Where f is the ideal switching frequency, $I_{load}$ is the current supplied to the load 150 and MaxI is the maximum output current of the machine 100. The above referenced equation may be useful as it might be applicable to machines with different operating current ranges. For example, the power supply 100 may be used to supply power to a plasma cutter or a plasma arc welder having different maximum current ranges (e.g., 200 Amps, 360 Amps, 540 Amps, 720 Amps, etc.)

As an alternative example, a listing, such as a look-up table, referencing various values for Iload and corresponding ideal switching frequencies may be stored in the memory 166. In general, the ideal switching frequency will be linearly reduced as current increases, as described above. During operation, at block 220, the processor 165 may determine the ideal switching frequency from the look up table.

It is to be appreciated, that the frequency range used in the above example is given for illustrative purposes only and is not intended to be limiting. Other frequency ranges may be used if they present a more efficient operating condition for the load 150.

Continuing from block 220 to block 230, the switch controller 167 may include logic and/or features configured to cause the switching frequency of the chopper circuit 140 to be substantially equal to the determined ideal switching frequency. For example, if the determined ideal switching frequency is 17.5 kHz, the switch controller 167 may cause the switch 144 to open and close with a period substantially equal to 17.5 kHz.

In some embodiments, the chopper control circuit 160 may additionally monitor other characteristics of the power supply 100, such as, for example, the output current ripple associated with Iload and/or the junction temperature of the switch 144. These monitored values may also be used to determine the ideal switching frequency. For example, if the junction temperature is increasing, switching frequency may be decreased in order to protect the power supply 100. Similarly, if the output current ripple is increasing, the switching frequency may be increased.

As depicted in FIG. 2, the method 200 may be continually repeated during operating of the plasma cutter or plasma arc welder to which the power supply 100 is supplying power. With some embodiments, the method 200 may be repeated periodically.

Figure 3:
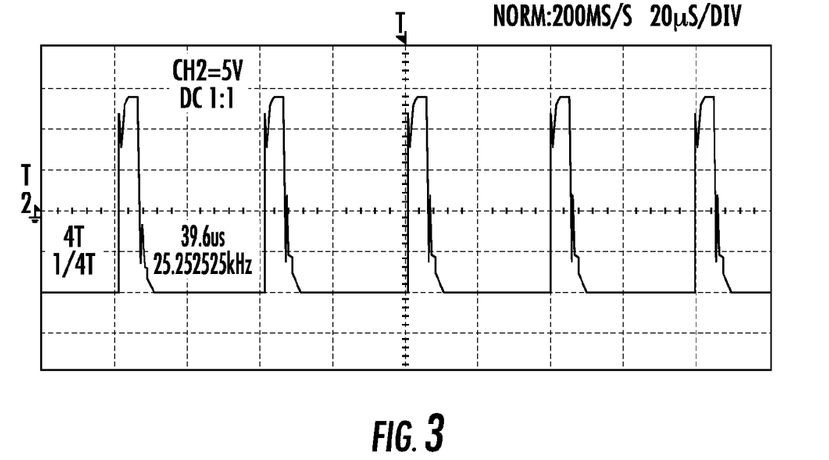
FIGS. 3-6 illustrate example waveforms showing switching frequency at various operating currents, all arranged in accordance with at least some embodiments of the present disclosure.
Figure 4:
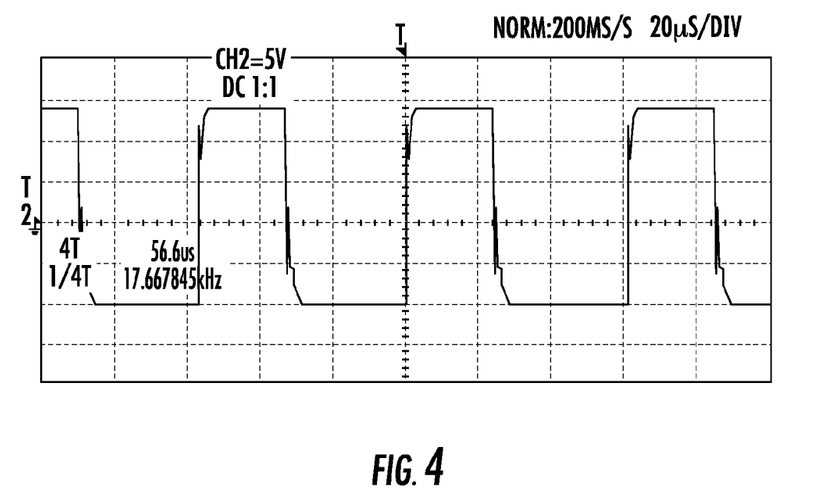
Figure 5:
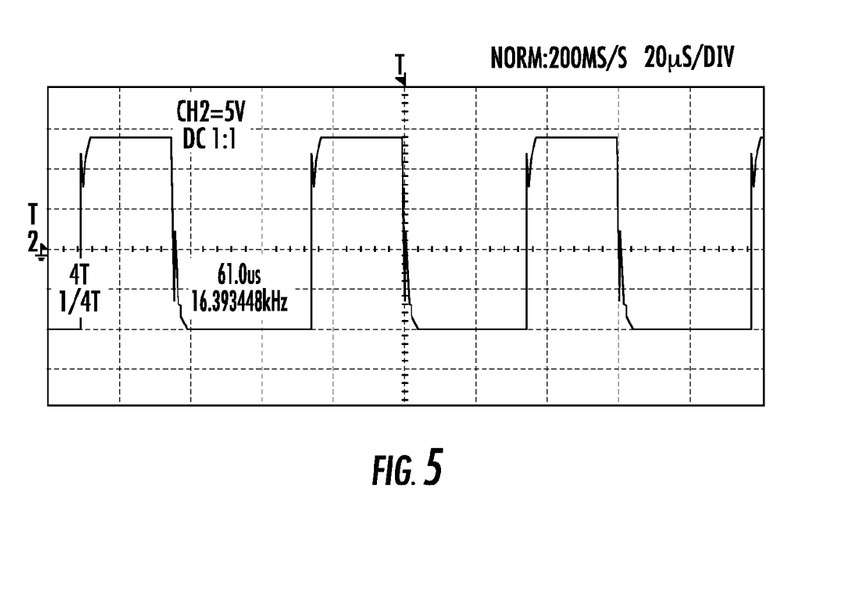
Figure 6:
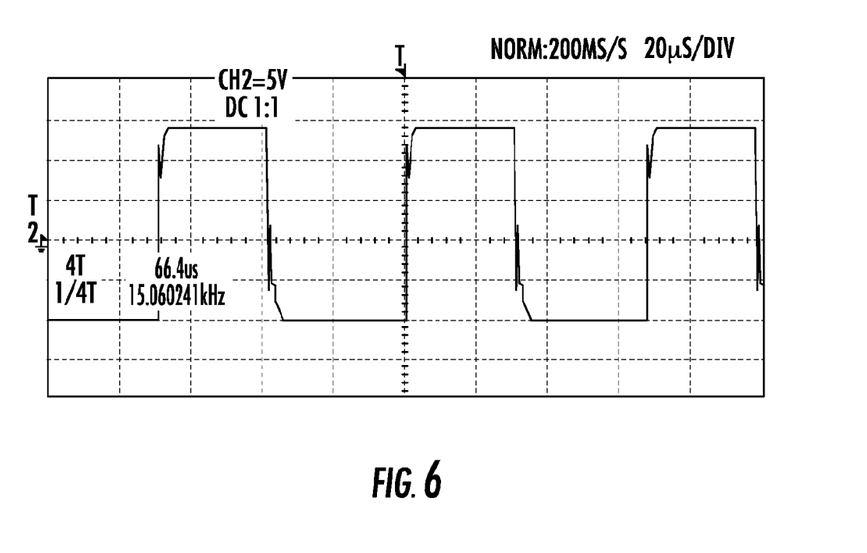

FIGS. 3-6 illustrate example waveforms that may correspond to the DC power output from the power supply 100. As depicted, the power supply 100 may be configured to vary the frequency of the DC power supplied to the load 150 through output inductor 146. For example, FIG. 3 illustrates an 18 Amp DC signal having a switching frequency of approximately 25 kHz. FIG. 4 illustrates a 250 Amp DC signal having a switching frequency of approximately 17.6 kHz. FIG. 5 illustrates a 300 Amp DC signal having a switching frequency of approximately 16.3 kHz. FIG. 6 illustrates a 360 Amp DC signal having a switching frequency of approximately 15 kHz.

In view of the forgoing, it will be appreciated that the power supply 100 and the method 200 of the present disclosure provide a number of important advantages relative to existing power supplies for plasma cutters and plasma arc welders. Particularly, the power supply 100 and the method 200 facilitate operation at a switching frequency that gives substantially the lowest output current ripple, substantially better arc stability, and acceptable switching losses at various current conditions. Additionally, the power supply 100 and the method 200 facilitate more consistent arc starting, better arc stability at low currents, and lower consumable wear.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Some embodiments of the disclosed device may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

The invention claimed is:

1. A power supply for forming a plasma arc in a plasma tool, the power supply comprising:
    a direct current (DC) power source;
    a chopper circuit configured to modulate a switching frequency of the DC power source; and
    a chopper control module configured to vary the switching frequency, the chopper control module including:
        a processor configured to identify a type of a plasma tool coupled to the power supply and determine a first switching frequency based on the type of the plasma tool; and
        a switch controller configured to cause the switching frequency of the DC power source to be substantially equal to the determined first switching frequency.

2. The power supply of claim 1, wherein the type of the plasma tool includes a plasma cutter or a plasma arc welder.

3. The power supply of claim 1, wherein:
    the processor is further configured to identify an ampere operating range of the type of the plasma tool coupled to the power supply; and
    the chopper control module is configured to vary the switching frequency of the chopper circuit further based on the ampere operating range of the type of the plasma tool coupled to the power supply.

4. The power supply of claim 1, wherein:
    the chopper control circuit further includes a measurement module configured to measure an output current value of the power supply; and
    the processor of the chopper control module is configured to determine the first switching frequency as a fixed switching frequency when the output current value from the power supply is smaller than or equal to a predetermined current value, and determine the first switching frequency as a variable switching frequency when the output current value from the power supply is greater than the predetermined current value.

5. The power supply of claim 1, wherein the chopper control module is further configured to monitor a ripple current of the chopper circuit and vary the switching frequency of the chopper circuit based on the monitored ripple current.

6. The power supply of claim 1, wherein the chopper control module is further configured to monitor a temperature of the chopper circuit and vary the switching frequency of the chopper circuit based on the monitored temperature.

7. The power supply of claim 1, wherein the processor of the chopper control module is further configured to select the first switching frequency from a look-up table that stores a plurality of switching frequencies.

8. A method for varying a switching frequency of a power supply for forming a plasma arc used in a plasma tool, comprising:
    identifying, by a processor, a type of a plasma tool coupled to the power supply;
    determining, by the processor, a first switching frequency based on at least the type of the plasma tool coupled to the power supply; and
    setting the switching frequency of the power supply to be substantially equal to the determined first switching frequency.

9. The method of claim 8, further comprising:
    identifying, by the processor, an ampere operating range of the type of the plasma tool coupled to the power supply; and
    determining, by the processor, the first switching frequency further based on the ampere operating range of the type of the plasma tool coupled to the power supply.

10. The method of claim 8, wherein the type of the plasma tool includes a plasma cutter or a plasma arc welder.

11. The method of claim 8, further comprising:
    measuring, by a current measurement module, an output current value of the power supply;
    determining, by the processor, the first switching frequency as a fixed switching frequency when the output current value from the power supply is smaller than or equal to a predetermined current value; and
    determining, by the processor, the first switching frequency as a variable switching frequency when the output current value from the power supply is greater than the predetermined current value.

12. The method of claim 8, further comprising:
    monitoring, by a controller circuit, a ripple current of an output of the power supply; and
    varying the switching frequency of the power supply based on the monitored ripple current.

13. The method of claim 8, further comprising:
    monitoring, by a controller circuit, a temperature of the power supply; and
    varying the switching frequency of the power supply based on the monitored temperature.

14. The method of claim 8, further comprising selecting the first switching frequency from a look-up table that stores a plurality of switching frequencies.

15. A non-transitory computer readable medium containing instructions which, when executed by a processor, cause the processor to perform a method comprising:
    identifying a type of a plasma tool coupled to a power supply;
    determining a first switching frequency based at least the type of the plasma tool coupled to the power supply; and
    setting a switching frequency of the power supply to be substantially equal to the determined first switching frequency.

16. The non-transitory computer readable medium of claim 15, wherein the instructions which, when executed by the processor, cause the processor to further perform:

identifying an ampere operating range of the type of the plasma tool coupled to the power supply; and determining the first switching frequency is further based on the ampere operating range of the type of the plasma tool coupled to the power supply.

17. The non-transitory computer readable medium of claim 15, wherein the instructions which, when executed by the processor, cause the processor to further perform:

receiving, from a current measurement module, an output current value of the power supply;

determining the first switching frequency as a fixed switching frequency when an output current value from the power supply is smaller than or equal to a predetermined current value; and determining the first switching frequency as a variable switching frequency when the output current value from the power supply is greater than the predetermined current value.

18. The non-transitory computer readable medium of claim 15, wherein the instructions which, when executed by the processor, cause the processor to further perform:

monitoring a ripple current of an output of the power supply; and varying the switching frequency of the power supply based on the monitored ripple current.

19. The non-transitory computer readable medium of claim 15, wherein the instructions which, when executed by the processor, cause the processor to further perform:

monitoring a temperature of the power supply; and varying the switching frequency of the power supply based on the monitored temperature.

20. The non-transitory computer readable medium of claim 15, wherein the type of the plasma tool includes a plasma cutter or a plasma arc welder.

* * * * *